(12) United States Patent
Park

(10) Patent No.: US 7,264,480 B2
(45) Date of Patent: Sep. 4, 2007

(54) DISPLAY DEVICE

(75) Inventor: Hyoung-Jun Park, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/529,034

(22) Filed: Sep. 28, 2006

(65) Prior Publication Data

US 2007/0021007 A1    Jan. 25, 2007

(51) Int. Cl.
*H05K 1/00*      (2006.01)

(52) U.S. Cl. ............................................. 439/61

(58) Field of Classification Search .................. 439/61
See application file for complete search history.

(56) References Cited

U.S. PATENT DOCUMENTS

| 2006/0098417 A1 | 5/2006 | Yuan et al. |
| 2006/0146226 A1 | 7/2006 | Hung et al. |

FOREIGN PATENT DOCUMENTS

| JP | 10-123558 | 5/1998 |
| JP | 10-285496 | 10/1998 |
| JP | 11-219122 | 8/1999 |
| JP | 2002-189210 | 7/2002 |
| JP | 2004-198937 | 7/2004 |
| KR | 10-2005-0058736 | 6/2005 |
| KR | 10-2005-0087232 | 8/2005 |
| KR | 10-2005-0104468 | 11/2005 |
| KR | 10-2006-0042764 | 5/2006 |
| KR | 10-2006-0046509 | 5/2006 |
| KR | 10-2006-0055888 | 5/2006 |
| KR | 10-2006-0068196 | 6/2006 |

OTHER PUBLICATIONS

English Abstract for Publication No. 10-123558.
English Abstract for Publication No. 10-285496.
English Abstract for Publication No. 11-219122.
English Abstract for Publication No. 2002-189210.
English Abstract for Publication No. 2004-198937.
English Abstract for Publication No. 10-2005-0058736.
English Abstract for Publication No. 10-2005-0087232.
English Abstract for Publication No. 10-2005-0104468.
English Abstract for Publication No. 10-2006-0042764.
English Abstract for Publication No. 10-2006-0046509.
English Abstract for Publication No. 10-2006-0055888.
English Abstract for Publication No. 10-2006-0068196.

*Primary Examiner*—Briggitte R. Hammond
(74) *Attorney, Agent, or Firm*—F. Chau & Associates, LLC

(57) ABSTRACT

A display device includes a panel assembly for forming an image, a printed circuit board (PCB) connected with the panel assembly and having a connector; a support member for supporting the panel assembly and having the PCB installed on a rear surface thereof, and a cover member combined with the support member, covering the PCB, and having an opening exposing the connector. A fixing part formed at the opening of the cover member fixes the connector to the PCB.

13 Claims, 7 Drawing Sheets

DISPLAY DEVICE

CROSS-REFERENCE TO RELATED APPLICATION

This application relates to Korean Patent Application No. 10-2005-0044640 filed in the Korean Intellectual Property Office on May 26, 2005, the entire contents of which are incorporated herein by reference.

BACKGROUND OF THE INVENTION (a) Field of the Invention

The present invention relates to a display device, and more particularly, to a display device with a structure of a cover member that covers a printed circuit board (PCB) providing a drive signal to a panel assembly.

(b) Description of Related Art

As semiconductor technologies have advanced, display devices, such as liquid crystal displays (LCD), have been developed to be small and light weight with high performance.

Given the size, weight, and performance, e.g., low power consumption, characteristics of LCDs, LCDs have been increasingly used as a substitute for conventional cathode ray tubes (CRT).

In light-receiving (non-emissive) LCD display devices, a voltage is applied to change a particular arrangement of molecules of liquid crystals, and by converting a change of optical properties such as double refractivity, optical rotary power, dichroism, or light scattering characteristics into a visual change, information is displayed by using light modulation in liquid crystal cells.

Typically, the display device, including the LCD, includes a panel assembly for displaying an image, a PCB for supplying a drive signal to the panel assembly, and support members for fixedly supporting the PCB. The support members include front and rear support members that are combined with the panel assembly interposed therebetween. The PCB can be fixedly installed on a rear surface of the rear support member, and a cover member can be combined with the rear support member to cover the PCB. The PCB includes a connector and the cover member includes an opening for exposing the connector.

Such a display device has a problem in that, during an assembly process thereof, a cable that is connected to the connector of the PCB may be separated from the PCB, resulting in a defective display device.

In addition, electromagnetic interference (EMI) generated from the connector of the PCB cannot be suppressed, causing a malfunction of the display device.

SUMMARY OF THE INVENTION

According to an exemplary embodiment of the present invention, a display device includes a panel assembly for forming an image, a printed circuit board (PCB) connected with the panel assembly and having a connector; a support member for supporting the panel assembly and having the PCB installed on a rear surface thereof, and a cover member combined with the support member, covering the PCB, and having an opening exposing the connector, wherein a fixing part formed at the opening of the cover member fixes the connector to the PCB.

The fixing part may elastically press the connector.

The cover member may include a cover part facing the PCB and a fixing part connected with the cover part.

Herein, the fixing part may include a protrusion that protrudes from the cover part toward the connector.

Also, the fixing part may additionally include a contact part that is bent and extends from an end portion of the protrusion and contacts the connector.

The contact part may extend in an inward direction of the cover member.

The contact part may extend in an outward direction of the cover member.

The display device may further include an elastic member located between the contact part and the connector so that the fixing part can elastically press the connector.

The display device may further include a gasket made of a metal material located between the contact part and the connector.

The display device may further include a gasket located between the cover part and the contact part face.

The PCB and the cover member may include a fastening hole, respectively, and the PCB and the cover member may be combined through the fastening hole by a screw.

The cover member may include a fastening part that has the fastening hole, a guide part that surrounds the fastening part and guides the screw into the fastening part, and a contact part that surrounds the guide part and contacts with the PCB.

The fastening part, the guide part, and the contact part may have a section in a concave-convex form.

Accordingly, in an assembling process, the connector can be substantially prevented from being separated from the PCB and EMI generated from the connector can be effectively suppressed.

DETAILED DESCRIPTION OF CERTAIN INVENTIVE EMBODIMENTS

Figure 1:
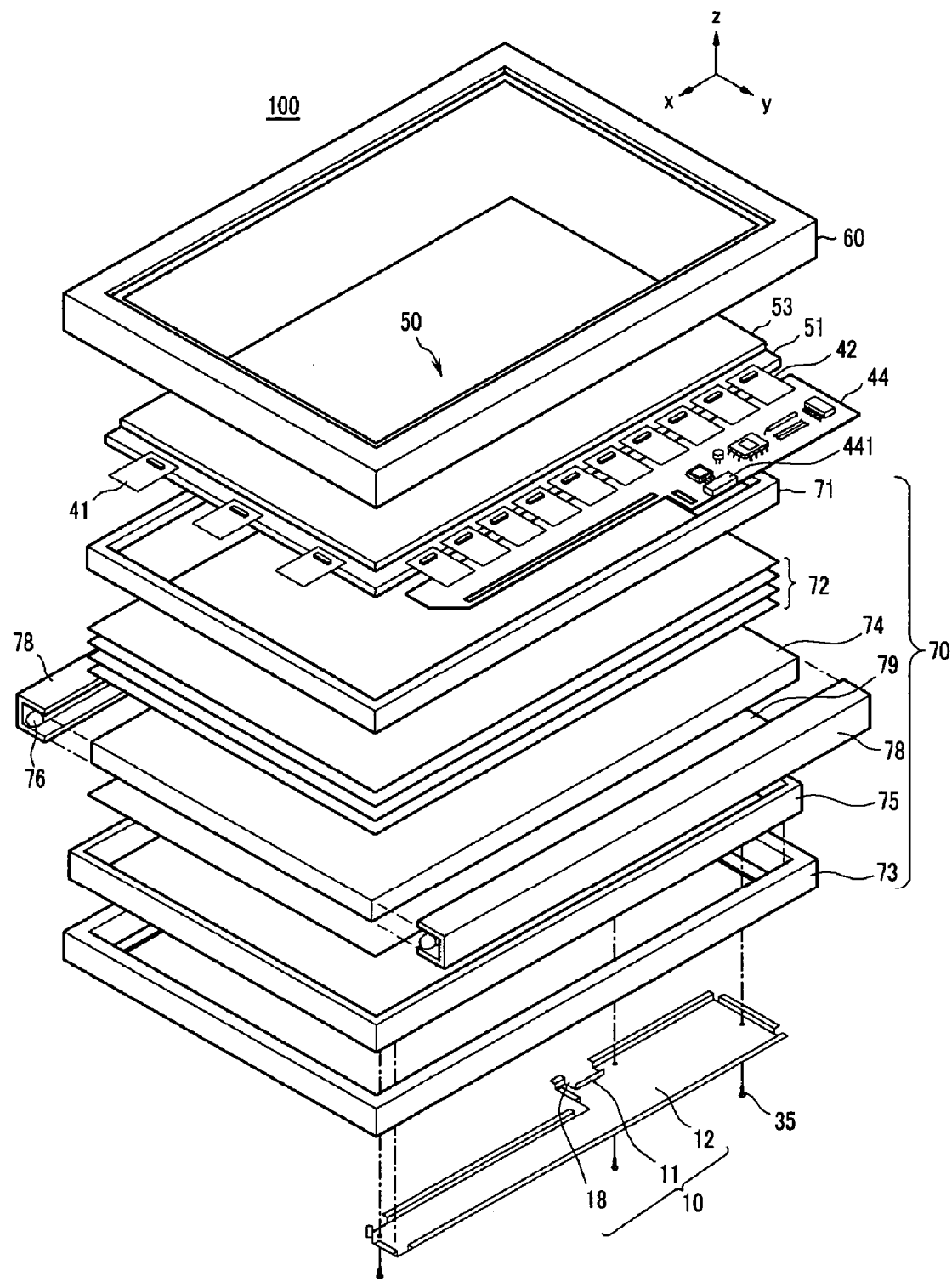
FIG. 1 is an exploded perspective view of a display device according to an embodiment of the present invention.

A display device according to exemplary embodiments of the present invention will now be described with reference to the accompanying drawings. A liquid crystal display panel is illustrated as an embodiment of a panel assembly employed for the display device in the accompanying drawings, which exemplifies and does not limit the present invention.

A display device having an edge type backlight assembly is illustrated as an embodiment of the present invention in the accompanying drawings, which exemplifies and does not limit the present invention.

In the drawings, the same reference numerals designate the same or like elements throughout the specification.

As shown in FIG. 1, according to an embodiment of the present invention, a display device 100 includes a backlight assembly 70 for providing light and a panel assembly 50 for displaying an image upon receiving light. The display device 100 additionally includes a front support member 60 for fixedly supporting the panel assembly 50 on the backlight assembly 70.

In addition, the display device 100 also includes a printed circuit board (PCB) 44 electrically connected with the panel assembly 50 via driving integrated circuit (IC) packages 41 and 42. The driving IC packages 41 and 42 can be formed as a chip on film (COF) or a tape carrier packet (TCP).

The panel assembly 50 includes a first panel 51 on which a plurality of thin film transistor (TFT)s are formed, a second panel 53 located to face the first panel 51, and liquid crystal (not shown) injected between the first panel 51 and the second panel 53. Although not shown, a polarizer is attached on a front surface of the second panel 53 and a rear surface of the first panel 51 to linearly polarize visible light provided from the backlight assembly 70.

The first panel 51 includes a plurality of gate lines and a plurality of data lines formed in a matrix on a transparent insulation substrate, TFTs formed at crossing points of the gate lines and the data lines, and pixel electrodes electrically connected with the TFTs. The TFTs may be made of, for example, transparent indium tin oxide (ITO) as a conductive material. In each TFT, a source terminal is connected with the data line, a gate terminal is connected with the gate line, and a drain terminal is connected with the pixel electrode.

Accordingly, a driving signal received from the PCB 44 is transferred to the gate lines and the data lines of the panel assembly 50 so as to be inputted to the source terminal and the gate terminal of each TFT. Each TFT turns pixels on or off according to the driving signal, switching pixel electrodes connected with the drain terminals.

The color filter substrate is located to face the first panel 51. The second panel 53 includes pixels of three primary colors (red, green, and blue, or bluish green, claret, and yellow), namely, color pixels that manifest a certain color as light passes there-through, and typically includes a common electrode made of a transparent material such as ITO on the entire surface thereof. When the TFTs that are switching elements are turned on, an electric field is formed between each pixel electrode and the common electrode. An arrangement angle of liquid crystals located between the first panel 51 and the second panel 53 changes by the electric field, and a desired image is obtained according to light transmittance that changes as a result of the change of the arrangement angle.

To control the arrangement angle of liquid crystals and the time at which the liquid crystals are arranged, the gate, lines and the data lines of the first panel 51 receive a drive signal and a timing signal from the PCB 44 through the driving IC packets 41 and 42.

The backlight assembly 70 includes a light source unit 76 for providing light, a light guide plate 74 for guiding light emitted from the light source unit 76 to the panel assembly 50, a reflection sheet 79 positioned on the entire surface of the lower portion of the light guide plate 74 for reflecting light emitted from the light source unit 76, a light source cover 78 for covering and protecting the light source unit 76, an inner surface of the light source cover 78 being coated with a reflection material to reflect light emitted from the light source unit 76, and an optical sheet 72 for obtaining luminance characteristics of light received from the light source unit 76 and providing light to the panel assembly 50. The backlight assembly 70 includes an upper mold frame 71 and a rear support member 75 for fixedly supporting the components. The backlight assembly 70 further includes a lower mold frame 73 located at an outer side of the rear support member 75 to support an edge of the rear side of the rear support member 75, and coupled to the front support member 60 together with the upper mold frame. 71 and the rear support member 75.

FIG. 1 shows a lamp as the light source unit 76, which is an example—the present invention is not limited thereto. Instead of the lamp, a light emitting diode (LED), a light source in a form of a linear light source or a surface light source, etc. can be also used.

Figure 2:
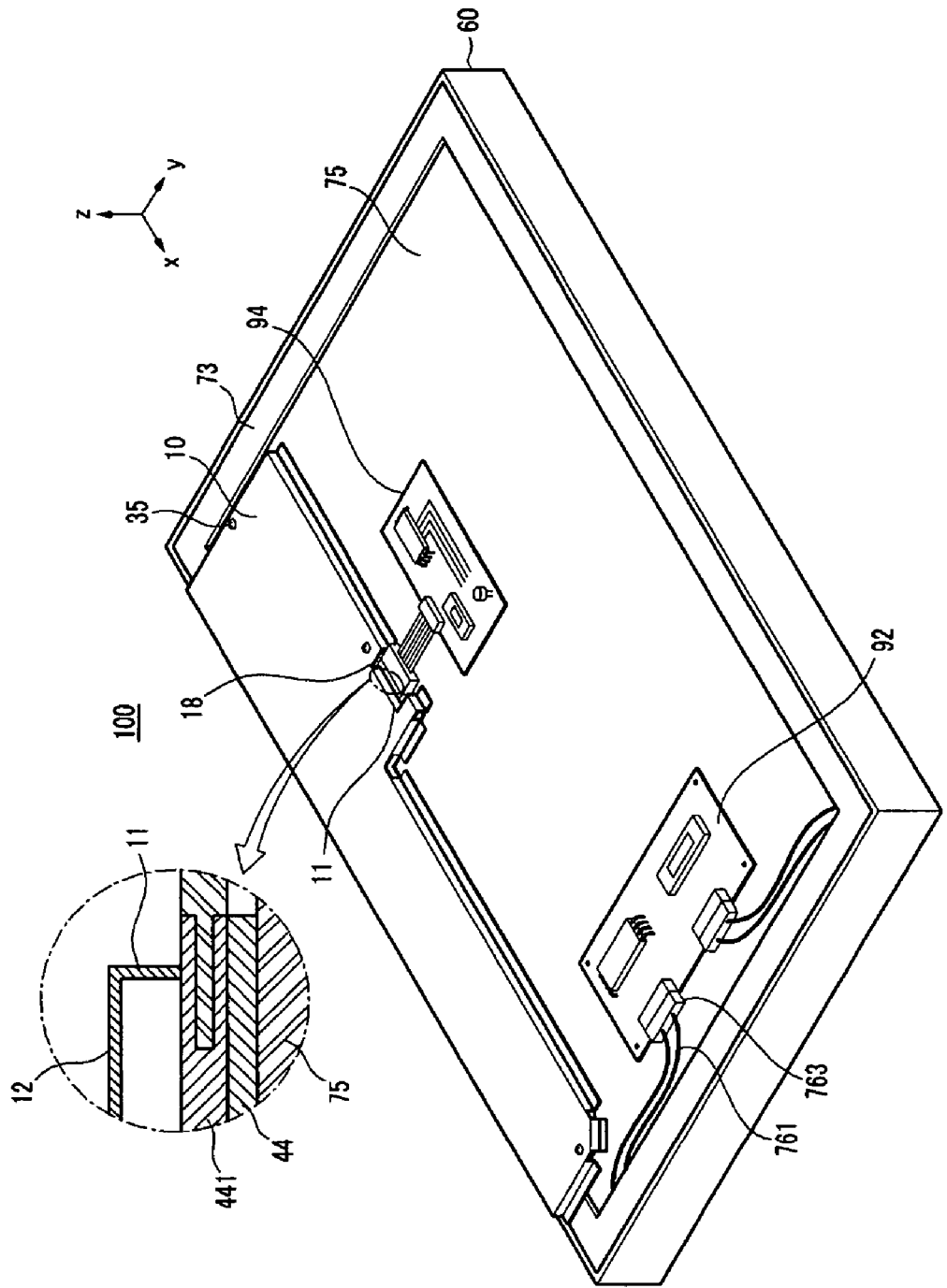
FIG. 2 is a perspective view showing a rear side of the display device as assembled in FIG. 1.

As shown in FIG. 2, the data driving IC packet 42 (refer to FIG. 1) for electrically connecting the PCB 44 and the panel assembly 50 is bent to be adjacent to the side of the lower mold frame 73. The PCB 44 having a connector 441 is installed at the rear surface of the rear support member 75. A cover member 10 for covering the PCB 44 and having an opening 18 for exposing the connector 441 is combined with the rear support member 75. A control circuit substrate 94 connected with the PCB 44 through the connector 441, and an inverter circuit board 92 for driving the light source unit 76 and located on the rear surface of the rear support member 75. The inverter circuit board 92 drives the light source unit 76 by converting external power received through a wire 761 and a socket 763 connected with the light source unit 76 into a certain voltage level and applying it to the light source unit 76. The PCB 44 receives signals needed for displaying an image on the panel assembly 50 through the control circuit board 94. The rear support member 75, the PCB 44, and the cover member 10 are combined with, for example, a screw 35. The cover member 10 is made of a metal material such as aluminum (Al) to protect the PCB 44 and also to shield EMI (electromagnetic interference) generated from the PCB 44.

As shown in the enlarged circle in FIG. 2, the cover member 10 includes a cover part 12 located to face the PCB 44 and a fixing part 11 connected with the cover part 12 and pressing the connector 441 such that the connector 441 is tightly attached on the PCB 44. The fixing part 11 protrudes toward the connector 441 to fix the connector 441 to be tightly attached on the PCB 44. The fixing part 11 can elastically press the connector 441. The fixing part 11 is formed at the opening 18 that exposes the connector 441.

With such a structure, in the process of electrically connecting the cable to the control circuit board 94 through the connector 441 of the PCB 44, namely, in the process of engaging the cable connected with the control circuit board 94 to the connector 441 of the PCB 44 and assembling it, the connector 441 can be substantially prevented from being separated from the PCB 44. In addition, because the connector 441 contacts the fixing part 11, EMI generated from the connector 441 can be shielded to a degree by the fixing part 11, so the EMI can be reduced.

Figure 3:
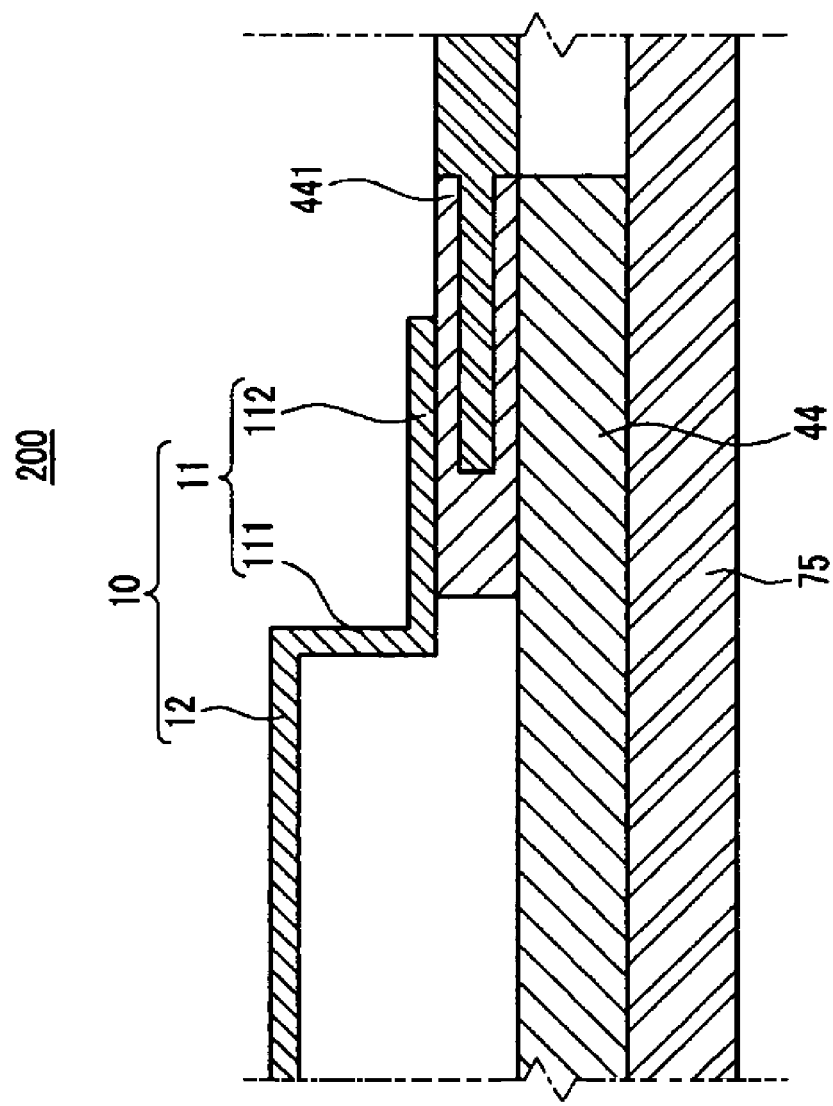
FIG. 3 is a sectional view showing a portion of a cover member of a display device according to an embodiment of the present invention.

According to an embodiment of the present invention, as shown in FIG. 3, the cover member 10 provided at a display device 200 includes a fixing part 11 including a protrusion 111 that protrudes from the cover part 12 toward the connector 441 and a contact part 112 that is bent and extended from an end portion of the protrusion 111 and that contacts the connector 441. The contact part 112 is bent and extends in an outward direction of the cover part 12.

With this structure, the fixing part 11 can press the connector 441 elastically, and given the increased area that the fixing part 11 contacts with the connector 441, the EMI generated from the connector 441 can be effectively suppressed.

Figure 4:
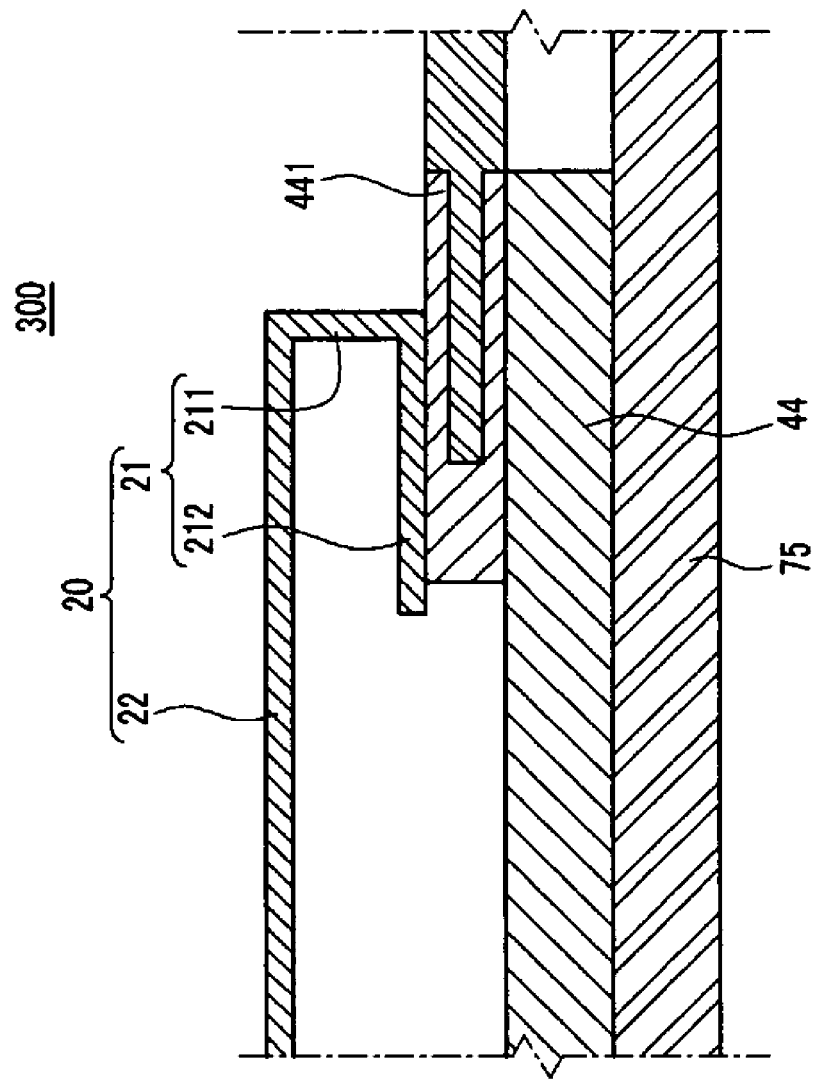
FIG. 4 is a sectional view showing a portion of a cover member of a display device according to an embodiment of the present invention.

According to an embodiment of the present invention, as shown in FIG. 4, the cover member 20 provided at a display device 300 includes a fixing part 21 including a protrusion 211 protruded from a cover part 22 toward the connector 441 and a contact part 212 that is bent and extends from an end portion of the protrusion 211 and contacts the connector 441. The contact part 212 is bent and extends in an inward direction of the cover part 22. Accordingly, the fixing part can press the connector 441 elastically, and given the increased area where the fixing part 21 contacts with the connector 441, heat generated from the connector 441 can be effectively released and the connector 441 can be stably supported.

Figure 5:
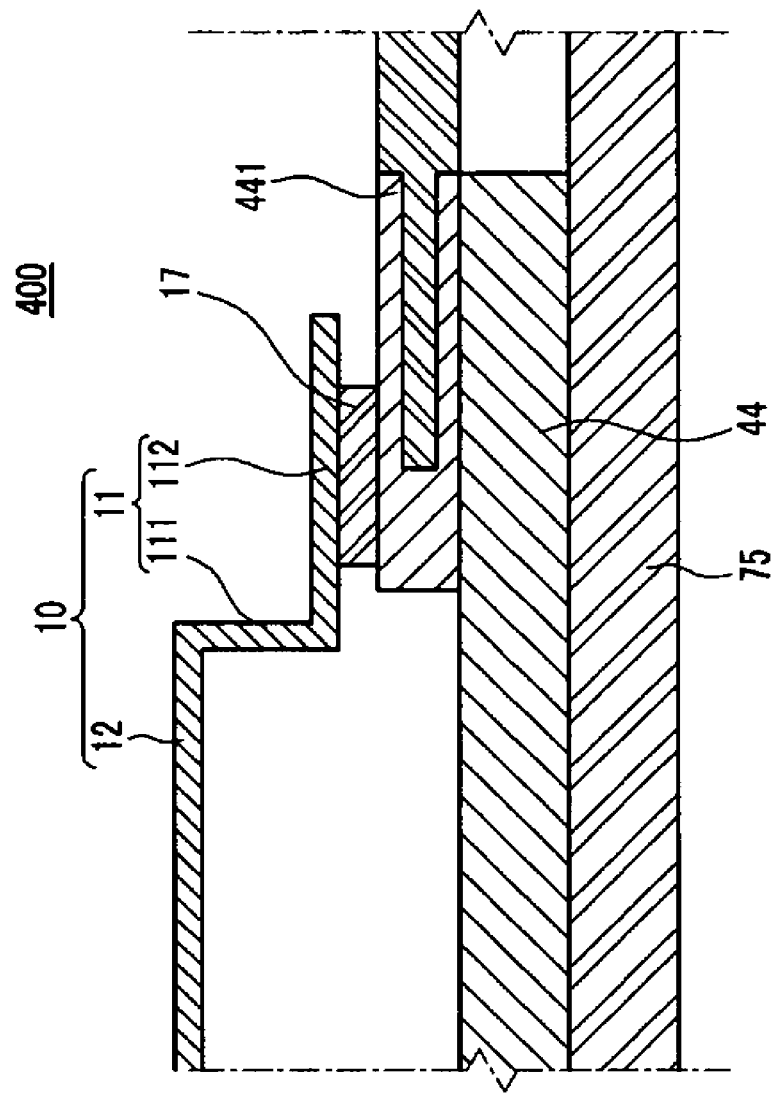
FIG. 5 is a sectional view showing a portion of a cover member of a display device according to an embodiment of the present invention.

According to an embodiment of the present invention, as shown in FIG. 5, the cover member 10 provided at a display device 400 includes a gasket 17 located between the fixing part 11 and the connector 441 of the PCB 44. The gasket 17 can be made of the same material as the cover member 10, or can be made of a material including, for example, at least one of stainless steel with good conductivity, aluminum, or magnesium. A cushion member such as sponge can be installed within the gasket 17 to obtain elasticity.

With the gasket 17 located, EMI generated from the connector 441 can be effectively suppressed and elasticity can be also obtained.

In addition, instead of the gasket 17, an elastic member can be located between the fixing part 11 and the connector 441. Accordingly, the fixing part 11 can elastically press the connector 441.

Figure 6:
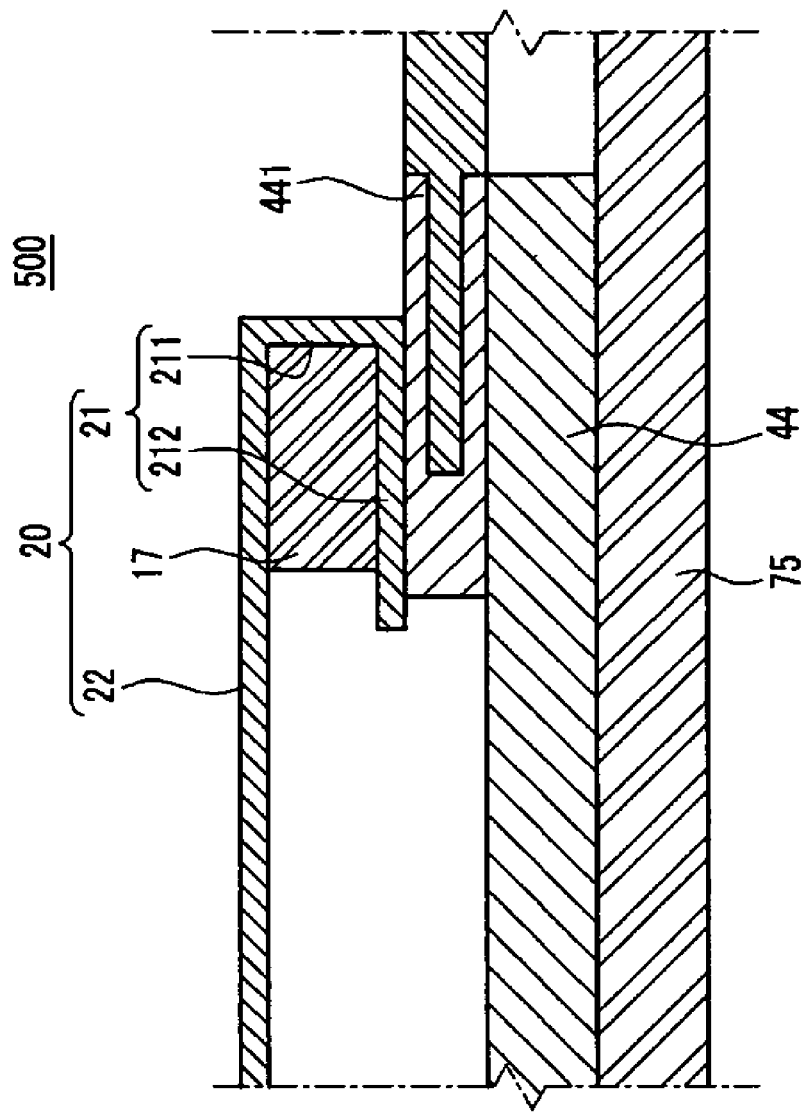
FIG. 6 is a sectional view showing a portion of a cover member of a display device according to an embodiment of the present invention.

According to an embodiment of the present invention, as shown in FIG. 6, the cover member 20 provided at a display device 500 includes a fixing part 21 including a protrusion 211 that protrudes from the cover part 22 toward the connector 441 and the contact part 212 that is bent and extends in an inward direction of the cover part 22 from an end portion of the protrusion 211 to contact the connector 441. The gasket 17 is located at a space where an upper portion of the cover part 22 and the contact part 212 face each other.

Thus, EMI generated from the connector 441 can be effectively suppressed, and the fixing part 21 of the cover member 20 can effectively fix the connector 441 so as to be tightly attached on the PCB 44.

Figure 7:
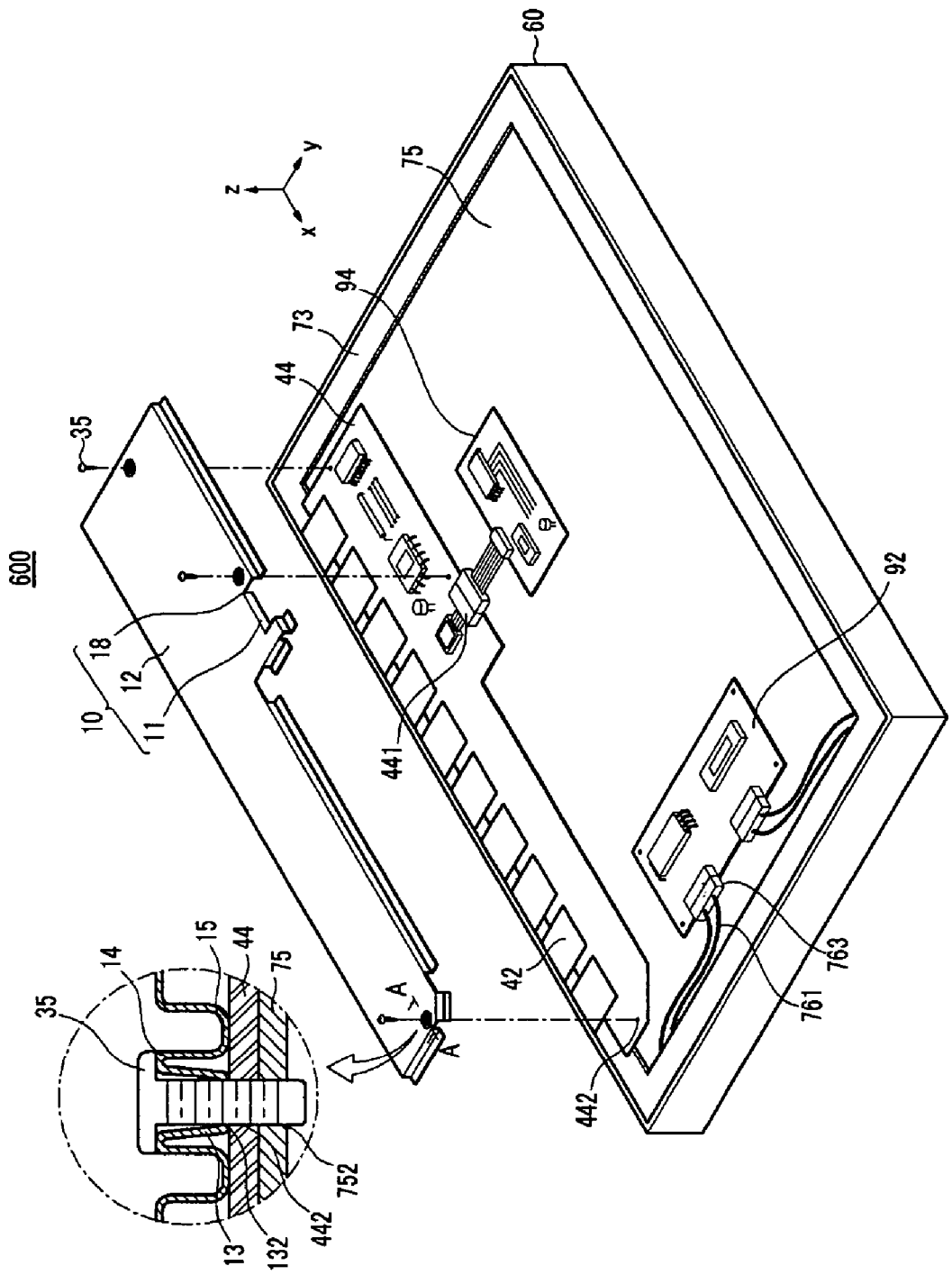
FIG. 7 is a perspective view of a rear side of a display device according to an embodiment of the present invention.

According to an embodiment of the present invention, as shown in FIG. 7, a display device 600 includes the PCB 44 installed on the rear surface of the rear support member 75 and the cover member 10 combined with the rear support member 75 and covering the PCB 44. The rear support member 75, the PCB 44, and the cover member 10 have fastening holes 752, 442, and 132, respectively so as to be coupled with each other by using a screw 35.

As shown in an enlarged circle in FIG. 7, the cover member 10 includes a fastening part 13 having a fastening hole 132, a guide part 14 for surrounding the fasting part 13 and guiding the screw 35 into the fastening part 13, and a contact part 15 for surrounding the guide part 14 and contacting the PCB 44. The fastening part 13, the guide part 14, and the contact part 15 have sections in a concave-convex form.

With such a structure, when the cover member 10 is combined with the PCB 44 and the rear support member 75, the guide part 14 guides and supports the screw 35 to allow the screw 35 to be threaded more easily. In addition, since the contact part 15 contacts the PCB 44, the contact area between the cover member 10 and the PCB 44 increases to effectively shield EMI generated from the PCB 44, and because the contact area of the PCB 44 increases, heat generated from the PCB 44 can be effectively released.

While this invention has been described in connection with what is presently considered to be practical exemplary embodiments, it is to be understood that the invention is not limited thereto, but, on the contrary, is intended to cover various modifications and equivalent arrangements included within the spirit and scope of the disclosure.

What is claimed is:

1. A display device comprising:
   a panel assembly for forming an image;
   a printed circuit board (PCB) adapted to electrically connect the panel assembly and having a connector;
   a support member for supporting the panel assembly and having the PCB installed on a rear surface thereof; and
   a cover member combined with the support member, covering the PCB, and having an opening exposing the connector,
   wherein a fixing part formed at the opening of the cover member fixes the connector to the PCB.

2. The device of claim 1, wherein the fixing part elastically presses the connector.

3. The device of claim 1, wherein the cover member comprises a cover part facing the PCB and a fixing part connected with the cover part.

4. The device of claim 3, wherein the fixing part comprises a protrusion that protrudes from the cover part toward the connector.

5. The device of claim 4, wherein the fixing part further comprises a contact part which is bent and extends from an end portion of the protrusion and contacts the connector.

6. The device of claim 5, wherein the contact part extends in an inward direction of the cover member.

7. The device of claim 5, wherein the contact part extends in an outward direction of the cover member.

8. The device of claim 5, further comprising:
   an elastic member located between the contact part and the connector such that the fixing part elastically presses the connector.

9. The device of claim 5, further comprising:
   a gasket made of a metal material located between the contact part and the connector.

10. The device of claim 5, further comprising:
    a gasket located between the cover part and the contact part.

11. The device of claim 1, wherein the PCB and the cover member include a fastening hole, respectively, and the PCB and the cover member are combined through the fastening hole by a screw.

12. The device of claim 11, wherein the cover member comprises a fastening part that has the fastening hole, a guide part that surrounds the fastening part and guides the screw into the fastening part, and a contact part that surrounds the guide part and contacts the PCB.

13. The device of claim 12, wherein the fastening part, the guide part, and the contact part have a section in a concave-convex form.

* * * * *